UNITED STATES PATENT OFFICE.

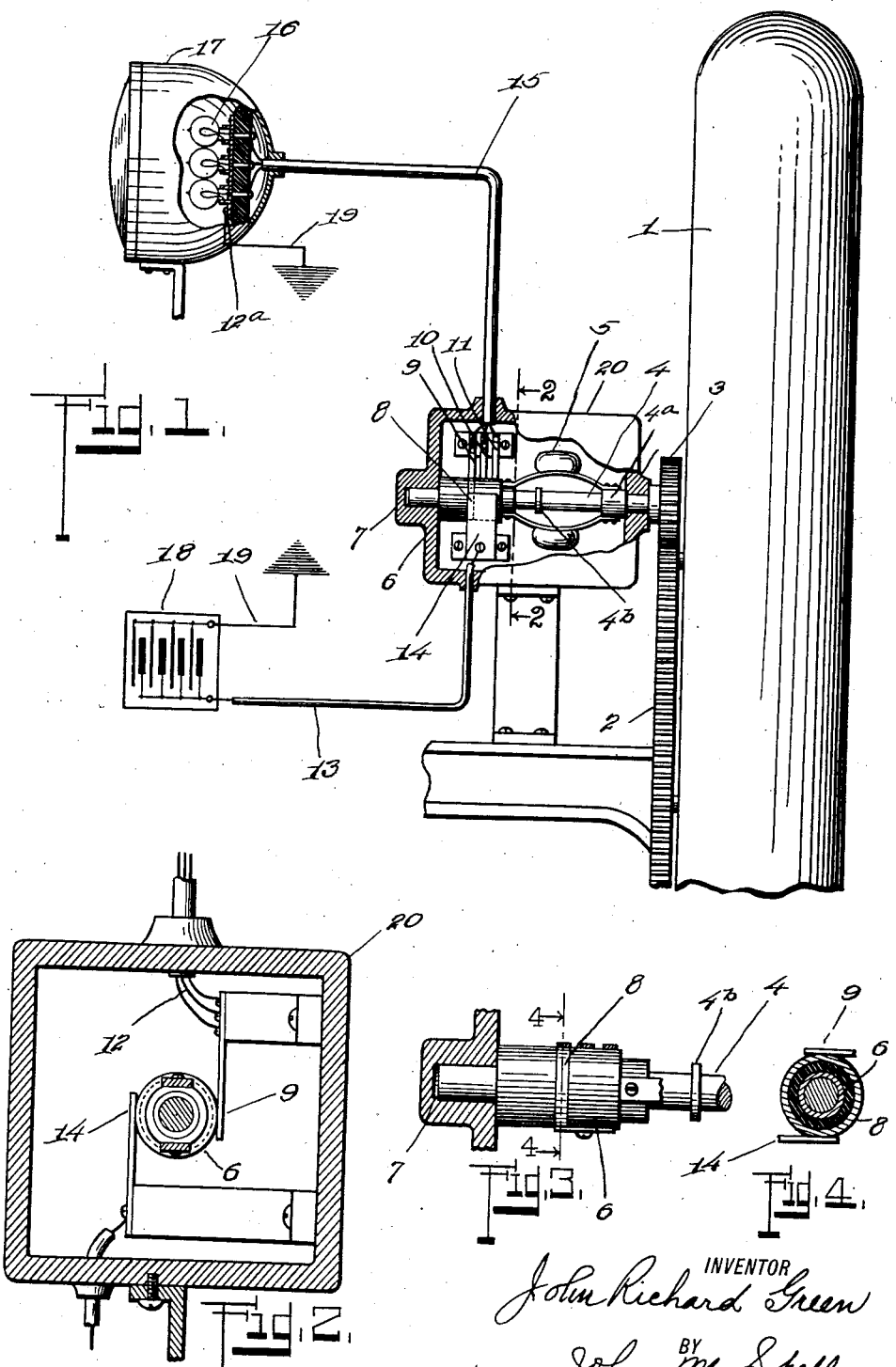

JOHN RICHARD GREEN, OF DALHART, TEXAS.

TAIL-END LIGHT FOR AUTOMOBILES.

1,311,345.  Specification of Letters Patent.  Patented July 29, 1919.

Application filed November 3, 1917. Serial No. 200,065.

*To all whom it may concern:*

Be it known that I, JOHN RICHARD GREEN, a citizen of the United States, residing at Dalhart, in the county of Dallam and State of Texas, have invented certain new and useful Improvements in Tail-End Lights for Automobiles, of which the following is a specification.

My invention has relation to an improvement in tail-end lights for automobiles, subway and surface trains and other motor propelled vehicles and in such connection it relates more particularly to the construction and arrangement of such a tail-end light.

The principal object of my invention is to provide an electrically illuminated signal which can be attached to the rear end of a vehicle, automobile, etc., and so arranged that the speed at which the conveyance is traveling is indicated by different colored lights, such as red, blue, green, etc., which lights are automatically cut into and out of an electric circuit as the speed of the vehicle varies.

Heretofore, as far as I am aware, the speed of a traveling automobile or other vehicle has been ascertained by a dial attached to the front of the automobile and connected to the rear axle of the same, and while such speed was readily ascertained by the driver, the only way by which an officer of the law, for instance, or a bystander, could determine the rate of speed at which the car was traveling was by a stop-watch, good judgment as to the variable speeds of automobiles, or mere guesswork.

Again in underground railways or subways the rear end or tail lights are invariably of one color and could not serve to indicate to a following train whether or not the preceding train was proceeding rapidly or slowly or had come to a full stop.

The above difficulties, I believe, are obviated by my combined speed indicator and tail-end light, and the invention will be more fully understood by reference to the following description, taken in connection with the accompanying drawings, forming part hereof, in which—

Figure 1 is a top or plan view of a tail-end light with parts broken away, embodying the main features of my invention.

Fig. 2 is a cross-sectional view taken on the line 2—2 of Fig. 1, showing the insulator shaft and contact posts.

Fig. 3 is a view of the insulator shaft, and

Fig. 4 is a cross-sectional view of the insulated core taken on the line 4—4 in Fig. 3.

Referring more particularly to the drawings, 1 represents the wheel of the vehicle, for instance an automobile, to the axle of which wheel is attached a gear wheel (not shown) in gear with a cog wheel 2, which latter wheel is in gear with the cog 3 secured to and operating the shaft 4. On this shaft 4 is secured a governor 5 and this governor has two weighted flat springs each secured at one of its ends to an enlarged portion 4ª of the shaft 4. The other end of each spring of the governor 5 is secured to an insulated sleeve 6 having on its periphery a metal ring 8 as shown in Figs. 1, 3 and 4. The ends of the shaft 4 rest in bearings 7. The contact ring 8 connects or disconnects with one or the other of the contact posts 9, 10 and 11 as the speed of the governor, actuated by the speed of the vehicle, varies, the expansion and contraction of the two springs of the governor, under centrifugal force, as the shaft revolves faster or slower, causing the insulated sleeve 6 to move backward or forward. About midway of the shaft 4 is a flange 4ᵇ which acts as an obstruction to keep the governor from drawing the insulated sleeve 6 too far from the contact posts. These contact posts 9, 10 and 11 are connected to three wires 12 which lead to one pole of each lamp, the wires being inclosed for safety in a pipe 15. One pole of each of the series of electric light bulbs 16 is connected with the bar or plate 12ª which is grounded. A contact plate 14 wipes over the contact ring 8 and is connected by a feed wire 13, leading to one pole of a battery 18. The wire 19 leading from the other pole of the battery and the ground wire 19 from the plate 12ª of the lamps are preferably connected to the frame of the vehicle, thus completing the circuit. The shaft, governor, etc., may be inclosed by a dust-proof casing or box 20.

As the speed of the vehicle increases or decreases, each lamp 16 is brought into circuit and displays its selected light through the reflecting hood 17. Thus when the vehicle is at rest or moving at very slow speed the lower lamp (which is red) is brought into circuit to display its light from the tail end of the vehicle. When the vehicle gathers more speed the second lamp (which is green) is brought into circuit and the first lamp cut out. When the vehicle reaches its maximum speed the first and second lamps are cut out and the third lamp (preferably orange) is brought into circuit.

Having thus described the nature and objects of my invention, what I claim as new and desire to secure by Letters Patent, is—

An electric tail-end light for automobiles, trains, etc., comprising different colored lamps each having one of its poles connected to a stationary bar and grounded, a wire leading from the other pole of each lamp, each of said wires terminating in a contact post, an insulated sleeve revolving beneath said posts, a metallic ring carried by said sleeve, a metallic plate in circuit with a battery and wiping over the ring of said sleeve, a governor arranged to shift the ring to alternate contact posts while still in contact with said plate, said governor controlled by the speed of said vehicle.

In testimony whereof I have signed my name to this specification.

JOHN RICHARD GREEN.